United States Patent
Kayano et al.

(10) Patent No.: US 9,505,289 B2
(45) Date of Patent: *Nov. 29, 2016

(54) TORQUE ESTIMATING DEVICE FOR COMPRESSOR

(75) Inventors: Kenta Kayano, Obu (JP); Takeshi Wakisaka, Ichinomiya (JP); Takekazu Kanou, Kariya (JP); Yoshikatsu Sawada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 317 days.

This patent is subject to a terminal disclaimer.

(21) Appl. No.: 13/200,032

(22) Filed: Sep. 15, 2011

(65) Prior Publication Data

US 2012/0067077 A1    Mar. 22, 2012

(30) Foreign Application Priority Data

Sep. 16, 2010 (JP) .................................. 2010-208151

(51) Int. Cl.
F25B 41/00      (2006.01)
B60H 1/32      (2006.01)
(Continued)

(52) U.S. Cl.
CPC .............. B60H 1/3205 (2013.01); F04F 5/54 (2013.01); F25B 41/00 (2013.01); F25B 49/005 (2013.01);
(Continued)

(58) Field of Classification Search
CPC ......... F04F 5/54; F25B 41/00; F25B 49/005; F25B 2500/19; F25B 2341/0011; F25B 2700/13; F25B 2700/195; F25B 2700/197; B60H 1/3205; B60H 2001/3273; B60H 2001/3298
USPC .............. 62/127, 191, 208, 209, 228.3, 500, 62/228.1; 702/41, 47, 50
See application file for complete search history.

(56) References Cited

U.S. PATENT DOCUMENTS 3,701,264 A * 10/1972 Newton .................. F25B 41/00
62/191
5,285,649 A    2/1994 Yamanaka et al.
(Continued)

FOREIGN PATENT DOCUMENTS

DE      102008016860      * 10/2008  .............. F25B 41/00
JP      2002-323264           11/2002
(Continued)

OTHER PUBLICATIONS

Office Action issued Sep. 3, 2013 in corresponding JP Application No. 2010-208151 (with English translation).
(Continued)

Primary Examiner — Frantz Jules
Assistant Examiner — Meraj A Shaikh
(74) Attorney, Agent, or Firm — Harness, Dickey & Pierce, P.L.C.

(57) ABSTRACT

A torque estimating device of a compressor for an ejector-type refrigerant cycle device includes a high pressure detector disposed to detect a physical amount having a relation with a high-pressure side refrigerant pressure of a refrigerant cycle, an evaporation pressure detector disposed to detect a physical amount having a relation with a refrigerant evaporation pressure in a suction side evaporator, a pressurizing estimating portion for estimating a pressurizing amount in a pressure increasing portion of an ejector to be increased in accordance with an increase of a pressure difference between the high-pressure side refrigerant pressure and the refrigerant evaporation pressure, and a suction pressure estimating portion for estimating a suction refrigerant pressure of the compressor by using the pressurizing amount estimated by the pressurizing estimating portion. Thus, a drive torque of the compressor can be accurately estimated in the ejector-type refrigerant cycle device.

17 Claims, 5 Drawing Sheets

(51) Int. Cl.
*F04F 5/54* (2006.01)
*F25B 49/00* (2006.01)

(52) U.S. Cl.
CPC ............... *B60H 2001/3273* (2013.01); *B60H 2001/3298* (2013.01); *F25B 2341/0011* (2013.01); *F25B 2500/19* (2013.01); *F25B 2700/13* (2013.01); *F25B 2700/195* (2013.01); *F25B 2700/197* (2013.01)

(56) References Cited

U.S. PATENT DOCUMENTS

| | | | | |
|---|---|---|---|---|
| 5,873,257 | A * | 2/1999 | Peterson | 62/180 |
| 6,910,344 | B2 * | 6/2005 | Matsubara | B60H 1/3216 417/12 |
| 7,676,331 | B2 * | 3/2010 | Sawada | F04B 35/002 62/228.1 |
| 7,779,647 | B2 * | 8/2010 | Takeuchi et al. | 62/500 |
| 7,841,193 | B2 * | 11/2010 | Nishida | F25B 41/00 62/170 |
| 8,424,338 | B2 * | 4/2013 | Yamada | F25B 41/00 62/500 |
| 8,429,931 | B2 * | 4/2013 | Ikegami | F25B 41/00 62/500 |
| 8,434,315 | B2 * | 5/2013 | Sawada | B60H 1/3208 374/141 |
| 8,650,904 | B2 * | 2/2014 | Oshitani | F04F 5/54 62/498 |
| 2001/0025499 | A1 | 10/2001 | Takeuchi et al. | |
| 2002/0184905 | A1 * | 12/2002 | Benedict et al. | 62/228.4 |
| 2003/0213264 | A1 * | 11/2003 | Ogata et al. | 62/500 |
| 2004/0003608 | A1 * | 1/2004 | Takeuchi | B60H 1/3204 62/170 |
| 2005/0172652 | A1 | 8/2005 | Ben Yahia | |
| 2005/0178150 | A1 | 8/2005 | Oshitani et al. | |
| 2006/0080977 | A1 * | 4/2006 | Noda | B60H 1/3208 62/129 |
| 2007/0000262 | A1 * | 1/2007 | Ikegami et al. | 62/170 |
| 2007/0039337 | A1 * | 2/2007 | Nishijima et al. | 62/170 |
| 2007/0180852 | A1 * | 8/2007 | Sugiura et al. | 62/500 |
| 2007/0289318 | A1 * | 12/2007 | Nakamura | 62/150 |
| 2008/0041079 | A1 * | 2/2008 | Nishijima et al. | 62/191 |
| 2008/0098757 | A1 | 5/2008 | Takeuchi et al. | |
| 2009/0260375 | A1 * | 10/2009 | Miyazaki | B60H 1/3208 62/133 |
| 2009/0293522 | A1 * | 12/2009 | Miyazaki | 62/231 |
| 2010/0162751 | A1 * | 7/2010 | Nishijima | F25B 1/10 62/500 |
| 2011/0005268 | A1 * | 1/2011 | Oshitani | F25B 41/00 62/500 |

FOREIGN PATENT DOCUMENTS

| | | |
|---|---|---|
| JP | 2002323264 A * | 11/2002 |
| JP | 2006-272982 | 10/2006 |
| JP | 2007-255764 | 10/2007 |
| JP | 2009222256 A | 10/2009 |
| JP | 2009-262602 | 11/2009 |
| JP | 2009-276047 | 11/2009 |
| JP | 2009276051 A | 11/2009 |

OTHER PUBLICATIONS

Office Action dated Feb. 19, 2016 in corresponding German Application No. 102011112756 with English translation.

* cited by examiner

TORQUE ESTIMATING DEVICE FOR COMPRESSOR

CROSS REFERENCE TO RELATED APPLICATION

This application is based on Japanese Patent Application No. 2010-208151 filed on Sep. 16, 2010, the contents of which are incorporated herein by reference in its entirety.

TECHNICAL FIELD

The present invention relates to a torque estimating device for estimating a drive torque of a compressor for an ejector-type refrigerant cycle device.

BACKGROUND

Conventionally, an ejector-type refrigerant cycle device having an ejector, provided with functions of a refrigerant decompression means and a refrigerant circulating means, is known, for example, in Patent Documents 1 to 3 (JP Patent No. 3322263 (corresponding to US 2001/0025499A1), JP Patent No. 3931899 (corresponding to US 2005/0178150A1), JP 2008-107055A (corresponding to US 2008/0098757A1)).

In the ejector adopted to the above ejector-type refrigerant cycle device, refrigerant is decompressed and expanded in a nozzle portion of the ejector in iso-entropy, and the refrigerant downstream of a suction side evaporator is drawn into the ejector from a refrigerant suction port by refrigerant suction action due to a high-speed refrigerant jetted from a jet port of the nozzle portion, thereby recovering the loss of the kinetic energy caused in the decompression and expansion of the nozzle portion.

Furthermore, the recovered kinetic energy is converted to the pressure energy in a diffuser portion (pressure increasing portion) of the ejector, thereby increasing the pressure of the refrigerant to be drawn into the compressor. Thus, the drive power of the compressor is reduced, thereby improving the coefficient of performance (COP).

It is desired to reduce unnecessary energy consumption in a driving device for driving a compressor while improving the COP in a refrigerant cycle device including an ejector-type refrigerant cycle device. For example, in a compressor driven by an engine, it is desired to reduce a fuel consumption in the engine.

In order to reduce the fuel consumption, Patent Document 4 (JP 2006-272982A) describes regarding a torque estimating device, which estimates a drive torque of a compressor for a refrigerant cycle. An energy amount supplied to a driving device is controlled based on the estimated drive torque, thereby reducing the fuel consumption.

More specifically, in JP Patent Document 4, the torque estimating device is adapted to a refrigerant cycle device that includes the compressor driven by the engine, a radiator for cooling the refrigerant discharged from the compressor, an expansion device for decompressing and expanding the refrigerant flowing out of the radiator, and an evaporator for evaporating the refrigerant decompressed and expanded in the expansion device.

The drive torque of the compressor is estimated by using a pressure increasing amount of the compressor and a refrigerant discharge amount of the compressor. Here, the pressure increasing amount of the compressor is a difference value between a discharge refrigerant pressure and a suction refrigerant pressure in the compressor, and the refrigerant discharge amount corresponds to a circulation refrigerant flow amount circulating in a refrigerant cycle.

In Patent Document 4, more specifically, a pressure difference between the pressure of a high-pressure side refrigerant from a discharge port of the compressor to a refrigerant inlet side of the expansion device, and the pressure of a low-pressure side refrigerant from a refrigerant outlet side of the expansion device to the suction side of the compressor, is adopted as the pressure increasing amount of the compressor, and the circulation refrigerant discharge amount is calculated based on the rotation speed of the compressor, so as to estimate the drive torque of the compressor.

In the Patent Document 4, the pressure of the low-pressure side refrigerant is calculated from a refrigerant evaporation temperature.

On the other hand, in the ejector-type refrigerant cycle device, the refrigerant flowing out of a suction side evaporator is drawn into a refrigerant suction port of the ejector, and the refrigerant pressurized in the diffuser portion of the ejector is drawn into the compressor.

Therefore, the refrigerant evaporation pressure of the suction side evaporator is different from the refrigerant pressure drawn into the compressor in the ejector-type refrigerant cycle device. Thus, even when the torque estimating device of the Patent Document 4 is used for the ejector-type refrigerant cycle device described in the Patent Documents 1 to 3, it is difficult to accurately estimate the drive torque of the compressor.

SUMMARY

In view of the foregoing problems, it is an object of the present invention to provide a torque estimating device for a compressor, which can accurately estimate a drive torque of the compressor for an ejector-type refrigerant cycle device.

According to an aspect of the present invention, a torque estimating device of a compressor is used for an ejector-type refrigerant cycle device that includes: the compressor configured to compress and discharge refrigerant; a radiator configured to cool the refrigerant discharged from the compressor; an ejector that includes a nozzle portion configured to decompress the refrigerant flowing out of the radiator, a refrigerant suction port from which refrigerant is drawn by jet refrigerant jetted from the nozzle portion, and a pressure increasing portion configured to mix the jet refrigerant and the refrigerant drawn from the refrigerant suction port and to pressurizing the mixed refrigerant; and a suction side evaporator configured to evaporate the refrigerant to be drawn into the refrigerant suction port. The torque estimating device includes: a high pressure detector disposed to detect a physical amount having a relation with a high-pressure side refrigerant pressure of a refrigerant cycle; an evaporation pressure detector disposed to detect a physical amount having a relation with a refrigerant evaporation pressure in the suction side evaporator; a pressurizing estimating means for estimating a pressurizing amount in the pressure increasing portion to be increased in accordance with an increase of a pressure difference between the high-pressure side refrigerant pressure and the refrigerant evaporation pressure; and a suction pressure estimating means for estimating a suction refrigerant pressure of the compressor by using the pressurizing amount estimated by the pressurizing estimating means.

Accordingly, the pressurizing amount in the pressure increasing portion of the ejector can be accurately estimated, thereby accurately estimating the suction refrigerant pressure of the compressor in the ejector-type refrigerant cycle device. Thus, a drive torque of the compressor can be accurately estimated by using a pressurizing amount of the compressor. For example, the high-pressure side refrigerant pressure is a refrigerant pressure from a refrigerant discharge side of the compressor to a refrigerant state before being decompressed.

For example, the torque estimating device of the compressor may further include a circulation flow amount detector disposed to detect a physical amount having a relation with a circulation refrigerant flow amount circulating in the refrigerant cycle; a circulation flow amount estimating means for estimating the circulation refrigerant flow amount by using the physical amount detected by the circulation flow amount detector; and a torque estimating means for estimating a drive torque of the compressor, using the suction refrigerant pressure estimated by the suction pressure estimating means and using the circulation refrigerant flow amount estimated by the circulation flow amount estimating means. Alternatively, the torque estimating device of the compressor may further include a circulation flow amount detector disposed to detect a circulation refrigerant flow amount circulating in the refrigerant cycle; and a torque estimating means for estimating a drive torque of the compressor, using the suction refrigerant pressure estimated by the suction pressure estimating means and using the circulation refrigerant flow amount detected by the circulation flow amount detector. In this case, the circulation flow amount detector may be a flow amount sensor disposed to detect a flow amount of the refrigerant discharged from the compressor or a flow amount of the refrigerant drawn into the compressor.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF THE EMBODIMENTS

First Embodiment

Figure 1:
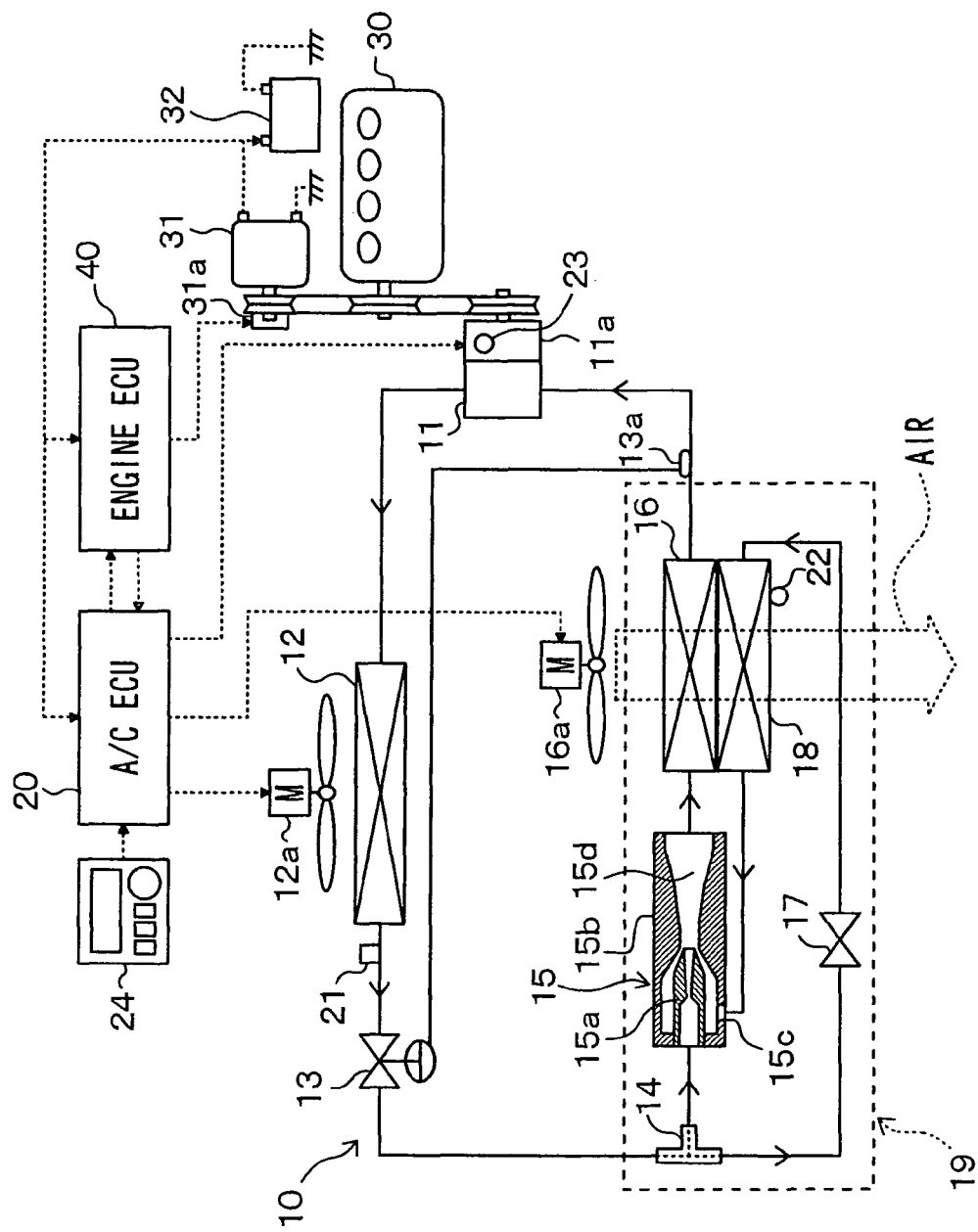
FIG. 1 is an entire schematic diagram of an ejector-type refrigerant cycle device according to a first embodiment of the invention.

A first embodiment of the invention will be described below with reference to FIGS. 1 to 5. FIG. 1 is an entire schematic diagram of an ejector-type refrigerant cycle device 10 of the present embodiment, to which a torque estimating device of a compressor is applied. The ejector-type refrigerant cycle device 10 is adapted to a vehicle air conditioner for cooling air to be blown into a vehicle compartment that is a space to be air-conditioned. In the present embodiment, the air to be blown into the vehicle compartment is an example of a fluid to be cooled.

In the ejector-type refrigerant cycle device 10, a compressor 11 is configured to draw refrigerant and to compress the drawn refrigerant. The compressor 11 is rotated and driven by a drive force transmitted from an engine 30 via a pulley and a belt. The engine 30 is an internal combustion engine, which outputs a drive force for a vehicle traveling by using a fuel such as gasoline. Next, the structure of the engine 30 will be described in detail.

As the compressor 11, a variable displacement compressor may be used, in which the discharge capacity is changeable based on a control signal from an exterior. Specifically, the compressor 11 of the present embodiment includes a compression mechanism of a swash-plate displacement variable type, in which a slant angle of a swash plate is changed by changing a control pressure Pc in a swash plate chamber so that a stroke of a piston connected to the swash plate is changed.

Thus, the refrigerant discharge capacity of the compressor 11 can be continuously changed by changing the stroke of the piston connected to the swash plate. Here, the refrigerant discharge capacity corresponds to a geometric capacity of an operation space for performing suction and compression of refrigerant. That is, the refrigerant discharge capacity corresponds to a cylinder capacity between a top dead point and a bottom dead point of the piston stroke.

The control pressure Pc of the swash plate chamber is changed by changing a valve open degree of an electromagnetic capacity control valve 11a. That is, a ratio between a discharge refrigerant amount and a suction refrigerant amount introduced into the swash plate chamber is changed, so that the control pressure Pc of the swash plate chamber can be adjusted. The operation of the electromagnetic capacity control valve 11a is controlled by a control current output from an air conditioning controller 20 (A/C ECU).

A refrigerant radiator 12 is connected to a refrigerant discharge side of the compressor 11. The radiator 12 is a heat-radiation heat exchanger in which high-temperature and high-pressure refrigerant discharged from the compressor 11 is heat-exchanged with outside air (i.e., air outside of the vehicle compartment) blown by a cooling fan 12a, thereby cooling the high-pressure refrigerant. The cooling fan 12a is an electrical fan, in which its rotational speed (air blowing amount) is controlled by a control voltage output from the air conditioning controller 20.

In the present embodiment, a flon-based refrigerant is used as the refrigerant for a refrigerant cycle of the ejector-type refrigerant cycle device 10 to form a vapor-compression sub-critical refrigerant cycle in which a refrigerant pressure on the high-pressure side does not exceed the critical pressure of the refrigerant. Thus, the radiator 12 is adapted as a condenser in which refrigerant is cooled and condensed. Furthermore, a refrigerator oil is mixed to the refrigerant in order to lubricate the compressor 11, so that the refrigerator oil is circulated in the refrigerant cycle together with the refrigerant.

An expansion valve 13 as a variable throttle mechanism is connected to a refrigerant outlet side of the radiator 12. The expansion valve 13 is adapted as a decompression portion for decompressing the high-pressure refrigerant flowing out of the radiator 12 into a middle pressure of a gas-liquid two-phase state, and is also adapted as a flow adjusting portion for adjusting a flow amount of the refrigerant flowing toward downstream of the expansion valve 13.

In the present embodiment, a thermal expansion valve is used as the expansion valve 13. Specifically, the thermal expansion valve 13 has a temperature sensing portion 13a arranged in a refrigerant passage at a refrigerant outlet side of a discharge side evaporator 16 described later. The thermal expansion valve 13 is a variable throttle mechanism, in which a super-heat degree of the refrigerant at the refrigerant outlet side of the discharge side evaporator 16 is detected based on temperature and pressure of the refrigerant at the refrigerant outlet side of the discharge side evaporator 16, and its valve-open degree (refrigerant flow amount) is adjusted by using a mechanical mechanism so that the super-heat degree of the refrigerant at the refrigerant outlet side of the discharge side evaporator 16 is approached to a predetermined value.

A branch portion 14 is connected to a refrigerant outlet side of the expansion valve 13, to branch the flow of a gas-liquid middle-pressure refrigerant decompressed and expanded by the expansion valve 13. For example, the branch portion 14 is a three-way joint structure having three ports that are used as one refrigerant inlet and two refrigerant outlets. The branch portion 14 may be configured by bonding plural pipes, or may be configured by providing plural refrigerant passages in a metal block member or a resin block member.

One of the two refrigerant outlets of the branch portion 14 is connected to a refrigerant inlet side of a nozzle portion 15a of the ejector 15, and the other one of the two refrigerant outlets of the branch portion 14 is connected to a refrigerant inlet side of a throttle 17. In the present embodiment, the refrigerant passage area and the refrigerant passage shape of the branch portion 14 are set, so as to set a ratio of a flow amount of the refrigerant flowing toward the nozzle portion 15a and a flow amount of the refrigerant flowing toward the throttle 17, and a refrigerant state flowing toward the nozzle portion 15a and the throttle 17. That is, the refrigerant passage area and the refrigerant passage shape of the branch portion 14 are set so as to improve the coefficient of performance in the entire cycle.

The ejector 15 is adapted as a refrigerant decompression means for decompressing and expanding a middle-pressure refrigerant branched at the branch portion 14 to a low-pressure refrigerant, and as a refrigerant circulation means for circulating the refrigerant by the suction action of a high-speed refrigerant flow jetted from the nozzle portion 15a.

The ejector 15 of the embodiment is configured to have the nozzle portion 15a and a body portion 15b. First, the nozzle portion 15a is formed from an approximately cylindrical member made of a metal (for example, brass, a stainless alloy). As shown in FIG. 1, the nozzle portion 15a is formed in a taper shape tapered toward a refrigerant flow direction. The refrigerant passage area inside of the nozzle portion 15a is configured so that the refrigerant is decompressed in iso-entropy.

The refrigerant passage formed inside of the nozzle portion 15a has a throat portion in which the refrigerant passage area becomes smallest, and an expansion portion in which the refrigerant passage area is gradually increased from the throat portion to the refrigerant jet port. That is, the nozzle portion 15a is configured by a Laval nozzle portion that is set such that the flow speed of the refrigerant flowing in the throat portion becomes equal to or larger than the sound speed. The nozzle portion 15a may be configured by a tip nozzle portion.

The body portion 15b is formed from an approximately cylindrical metal (e.g., aluminum). The body portion 15b is adapted as a fixing member for supporting and fixing the nozzle portion 15a therein, and defines an outer shell of the ejector 15. Specifically, the nozzle portion 15a is fitted and fixed into one end side of the body portion 15b in a longitudinal direction. Thus, it can prevent the refrigerant from being leaked from the fixing portion between the nozzle portion 15a and the body portion 15b.

The refrigerant suction port 15c is formed in an outer peripheral surface of the body portion 15b to penetrate through the outer peripheral surface of the body portion 15b at a position corresponding to an outer peripheral side of the nozzle portion 15a, so that the refrigerant suction port 15c communicates with the refrigerant jet port of the nozzle portion 15a. The refrigerant suction port 15c is a through hole provided to penetrate through the interior and the exterior of the body portion 15b. The refrigerant suction port 15c is provided such that the refrigerant flowing out of the suction side evaporator 18 is drawn into the ejector 15 inside of the body portion 15b, by a suction action caused due to the suction action of the refrigerant jetted from the nozzle portion 15a.

Within the body portion 15b, there is provided with a suction passage through which the refrigerant drawn from the refrigerant suction port 15c is introduced into a diffuser portion 15d, and the diffuser portion 15d in which the refrigerant jetted from the nozzle portion 15a and the refrigerant drawn from the refrigerant suction port 15c via the suction passage are mixed and pressurized. Therefore, the diffuser portion 15d provided in the body portion 15b is adapted as a mixing portion and a pressure increasing portion.

The suction passage is provided by using a space between an outer peripheral surface of the tapered nozzle portion 15a and an inner peripheral surface of the body portion 15b, and the refrigerant passage area of the suction passage is gradually reduced as toward downstream in a refrigerant flow direction from the refrigerant suction port 15c. Thus, the flow speed of the refrigerant flowing through the suction passage in the body portion 15b can be gradually increased, thereby reducing the energy loss caused while the suction refrigerant and the jet refrigerant are mixing in the diffuser portion 15d.

The diffuser portion 15d is provided to communicate with an outlet of the suction passage, such that the refrigerant passage area is gradually enlarged toward the outlet of the diffuser portion 15d. In the diffuser portion 15d, the jet refrigerant jetted from the nozzle portion 15a and the suction refrigerant from the suction passage are mixed and pressurized, so that the speed energy of the mixed refrigerant is converted to the pressure energy, thereby increasing the pressure of the mixed refrigerant.

The discharge side evaporator 16 is connected to the refrigerant outlet side of the diffuser portion 15d. The discharge side evaporator 16 is a heat exchanger, in which the refrigerant flowing out of the diffuser portion 15d is heat-exchanged with air blown by a blower fan 16a, so that the refrigerant is evaporated by absorbing heat from air.

The blower fan 16a is an electrical blower in which the rotational speed (air blowing amount) is controlled by a control voltage output from the air conditioning controller 20. The refrigerant outlet of the discharge side evaporator 16 is coupled to a refrigerant suction port of the compressor 11.

The throttle 17 is connected to the other refrigerant outlet of the branch portion 14. The throttle 17 is adapted as a decompression means for decompressing the refrigerant flowing into the suction side evaporator 18, and is also adapted as a flow adjusting means for adjusting a flow amount of the refrigerant flowing into the suction side evaporator 18. As the throttle 17, a fixed throttle such as a capillary tube, an orifice or the like can be used.

The suction side evaporator 18 is configured to perform heat exchange between the refrigerant flowing out of the throttle 17 and air blown by the blower fan 16a and having passed through the discharge side evaporator 16, and is adapted as a heat-absorbing heat exchanger in which the refrigerant is evaporated so as to exert heat-absorbing action. The refrigerant suction port 15c of the ejector 15 is connected to a refrigerant outlet side of the suction side evaporator 18.

In the ejector-type refrigerant cycle device 10 of the present embodiment, the branch portion 14, the ejector 15, the discharge side evaporator 16, the throttle 17 and the suction side evaporator 18 which are enclosed by the chain line in FIG. 1 are integrally formed as an evaporator unit 19.

More specifically, as the discharge side evaporator 16 and the suction side evaporator 18, a tank-and-tube type heat exchanger may be used. For example, the discharge side evaporator 16 includes a plurality of tubes in which the refrigerant flows, and a pair of tanks arranged at two end sides of the tubes to distribute the refrigerant into the tubes and to join the refrigerant from the tubes.

The evaporators 16, 18 are formed to have common tanks so that the evaporators 16, 18 are integrated to form an integrated unit. The evaporators 16, 18 are arranged in series in an air flow direction, such that the discharge side evaporator 16 is arranged upstream of the suction side evaporator 18 with respect to the air flow direction. Thus, as shown in FIG. 1, air blown by the blower fan 16a flows through the discharge side evaporator 16 and the suction side evaporator 18 in this order.

For example, the ejector 15 is arranged in a tank of the evaporators 16, 18 or a separation tank, such that a longitudinal direction of the ejector 15 is parallel with a longitudinal direction of the tank of the evaporator 16, 18 or the separation tank. The elector 15 is bonded to the tank of the evaporators 16, 18 or the separation tank to be integrated thereto. The branch portion 14 and the throttle 17 are integrated to the evaporators 16, 18 by using a generally known bonding means or a mechanical means.

Next, the engine 30 will be described. The engine 30 includes a fuel injection valve (injector) for injecting fuel to a combustion chamber, a stator for stating an engine operation, and the like. A valve open time of the fuel injection valve is changed to change a fuel injection amount, thereby changing a rotation speed of the engine 30. The operation of the fuel injection valve is controlled by a control signal output from an engine controller 40 (engine ECU).

The engine 30 of the present embodiment is configured to output not only a drive force for a vehicle traveling and a drive force of the compressor 11, but also a drive force for driving an electrical generator 31. A rotation driving force from the engine 30 is transmitted to the electrical generator 31 via an electromagnetic clutch 31a and a belt. The operation of the electromagnetic clutch 31a is controlled by a control voltage outputted from the engine controller 40.

The engine controller 40 of the present embodiment adjusts a fuel injection amount injected from the fuel injection valve in accordance with a vehicle traveling load, a cooling capacity required in the ejector-type refrigerant cycle device 10, and an electrical power amount generated from the electrical generator 31 and stored in a battery 32. Then, the rotation drive force to be outputted from the engine 30 is adjusted by adjusting the fuel injection amount injected from the fuel injection valve.

The electrical power stored in the battery 32 is supplied to the electromagnetic capacity control valve 11a of the compressor 11, the cooling fan 12a, the blower fan 16a and the like via the air conditioning controller 20. Furthermore, the electrical power stored in the battery 32 is supplied to the stator, the fuel injection valve of the engine 30.

Next, an electrical control portion of the present embodiment will be described. The air conditioning controller 20 and the engine controller 40 are configured by a microcomputer, an output circuit, an input circuit, an electrical circuit and the like. The microcomputer is a generally known microcomputer including a CPU for performing a control process or a calculation process, a ROM for storing programs or data, and a memory circuit such as RAM and the like. The output circuit is configured to output a control signal or a control voltage to various components, and the input circuit is configured to input detection signals of various sensors.

The various components to be controlled such as the electromagnetic capacity control valve 11a of the compressor 11, the cooling fan 12a, the blower fan 16a or the like are connected to the output side of the air conditioning controller 20. Further, an air-conditioning operation panel 24 arranged near the instrument panel at the front portion in the vehicle compartment is connected to the input side of the air conditioning controller 20, so that operation signals are inputted from various kinds of air-conditioning operation switches provided on the operation panel 24. Similarly, detection signals from various sensors of an air conditioning sensor group are input to the input side of the air conditioning controller 20.

The air conditioning sensor group is connected to the input side of the air conditioning controller 20. For example, the air conditioning sensor group includes an inside air temperature sensor configured to detect a temperature Tr of the vehicle compartment, an outside air temperature sensor configured to detect an outside air temperature Tam, a solar sensor configured to detect a solar radiation Ts entering to the vehicle compartment, a high pressure sensor 21 for detecting a high-pressure side refrigerant pressure Ph, an evaporator temperature sensor 22 configured to detect a physical amount having a relation with a refrigerant evaporation temperature Te of the suction side evaporator 18, a compressor rotation-speed sensor 23 for detecting a rotation speed Nc of the compressor 11.

A high pressure refrigerant is discharged from the refrigerant discharge port of the compressor 11, and is introduced into the refrigerant inlet of the expansion valve 13 via the radiator 12. The high-pressure sensor 21 is disposed in a refrigerant passage from a refrigerant outlet of the radiator 12 to a refrigerant inlet of the expansion valve 13 to detect a refrigerant pressure Ph of a high-pressure side refrigerant before being decompressed.

In the present embodiment, the evaporator temperature sensor 22 is disposed to detect a fin temperature of a heat exchanging portion of the suction side evaporator 18. The fin temperature of the heat exchanging portion of the suction side evaporator 18 corresponds to the refrigerant evaporation temperature Te of the suction side evaporator 18. Thus, the refrigerant evaporation pressure Pe of the suction side evaporator 18 can be calculated based on the refrigerant evaporation temperature Te. That is, in the present embodiment, the evaporator temperature sensor 22 detects a physical amount having a relation with the refrigerant evaporation pressure Pe in the suction side evaporator 18.

The refrigerant flow amount discharged from the compressor 11 is increased in accordance with an increase of the rotation speed of the compressor 11. Thus, in the present embodiment, the compressor rotation speed sensor 23 is configured to detect a physical amount having a relation with the refrigerant circulation flow amount circulating in a refrigerant cycle.

Furthermore, the detection values of the high pressure sensor 21, the evaporator temperature sensor 22 and the compressor rotation-speed sensor 23 are used to estimate the drive torque of the compressor 11. Thus, in the present embodiment, the high pressure sensor 21, the evaporator temperature sensor 22 and the compressor rotation-speed sensor 23 are used in the torque estimating device of the compressor 11.

As for the various kinds of air-conditioning operation switches provided on the operation panel 24, specifically, there are provided an operation switch of the vehicular air conditioner, a vehicle compartment temperature setting switch for setting a target temperature Tset of the vehicle compartment that is a space to be air-conditioned.

The various components to be controlled such as the fuel injection valve, the stator and the like are connected to the output side of the engine controller 40, and are controlled by the engine controller 40. At an input side of the engine controller 40, an engine sensor group is connected for controlling the engine 30. The engine sensor group includes a voltage detector configured to detect an electrical voltage VB of the battery 32, an accelerator degree sensor configured to detect an accelerator stepping degree Acc, an engine rotation speed sensor configured to detect an engine rotation speed Ne, and the like.

The air conditioning controller 20 and the engine controller 40 are electrically connected with each other so as to communicate with each other. When a signal is input into one of the controllers 20, 40, the other of the controllers 20, 40 can control the components connected to the output side based on the signal. The engine controller 40 and the air conditioning controller 20 may be configured integrally as a single controller.

The air conditioning controller 20 and the engine controller 40 may be configured integrally as a controller for controlling the operation of the control components connected to its output side. Alternatively, the air conditioning controller 20 and the engine controller 40 may be configured to have respective control portions (hardware and software), which control the various components respectively.

In FIG. 1, the connection states of the air conditioning sensor group connected to the input side of the air conditioning controller 20 and the connection states of the engine sensor group connected to the input side of the engine controller 40 are omitted in order to simply indicate the structure of the entire system.

Operation of the system in the first embodiment will be described. First, a basic operation of the engine 30 will be described. When a vehicle start switch is turned on so as to start a drive of the vehicle, the engine controller 40 starts the operation of the stator thereby starting the operation of the engine 30. In this case, the control process for controlling the engine 30 is started by the engine controller 40.

In the control process for the engine 30, a control routine is repeated by a control period, until a vehicle stop is requested by a passenger. In the control process of the engine controller 40, detection signals of the engine sensor group and a control signal outputted from the air conditioning controller 20 are inputted, a fuel injection amount (valve open time) of the fuel injection valve is determined, and a control signal is outputted to the drive circuit of the fuel injection valve so that a determined fuel injection amount can be injected. For example, the control signal outputted from the air conditioning controller 20 is an estimating value of the drive torque Tr of the compressor 11.

More specifically, the engine controller 40 calculates a traveling load of the vehicle based on the detection signals of the engine sensor group, and determines a standard injection amount of the fuel injected from the fuel injection valve based on the calculated traveling load of the vehicle.

Furthermore, the engine controller 40 determines that an air-conditioning fuel injection amount is increased in accordance with the drive torque Tr of the compressor 11, outputted from the air conditioning controller 20 when the vehicle air conditioner is operated. Furthermore, when the electrical amount stored in the battery 32 is equal to lower than a standard storage amount, the electromagnetic clutch of the electrical generator 31 becomes in a connection state in which the drive force is transmittable, and an electrical-generation fuel injection amount for driving the electrical generator 31 is determined.

Then, the valve open time of the fuel injection valve is determined so that the injection amount of the fuel injected from the fuel injection valve becomes the total of the standard fuel injection amount, the air-conditioning fuel injection amount, and the electrical-generation fuel injection amount. Then, a control signal is output from the engine controller 40 to the drive circuit of the fuel injection valve, so that the fuel injection valve is opened for the determined valve-open time.

Thus, the drive force outputted from the engine 30 is controlled to become the total of the drive force required in the vehicle traveling, the drive force of the compressor 11 required in the cooling operation of the ejector-type refrigerant cycle device 10, and the drive force required to drive the electrical generator 31, thereby effectively reducing the fuel consumption in the engine 30.

Next, operation of the ejector-type refrigerant cycle device 10 of the present embodiment will be described with reference to the Mollier diagram of FIG. 2. The air conditioning controller 20 performs the control process of the air conditioning control in the ejector-type refrigerant cycle device 10, when the operation switch of the air conditioning operation panel 24 is turned on.

In a main routine of the air conditioning control process, the detection signals from the air conditioning sensor group and operation signals from the air conditioning operation panel 24 are read, control states of the various components are determined, and control signals for controlling the various components are output. The main routine of the air conditioning control process are repeated by every control period, until the air conditioner operation switch is turned off.

For example, in a control state of the electromagnetic capacity control valve 11a of the compressor 11, the target air temperature TAO to be blown into the vehicle compartment is controlled based on the detection signals of the air-conditioning sensor group and operation signals of the air-conditioning operation panel 24. Furthermore, a target evaporator temperature TEO is calculated as a target value of the air temperature blown from the suction side evaporator 18 in accordance with a control map stored in a memory circuit, based on the target air temperature TAO.

Then, the refrigerant discharge capacity of the compressor 11 is determined, so that a refrigerant evaporation temperature Te detected by the evaporator temperature sensor 22 becomes the target refrigerant evaporation temperature TEO. The evaporator temperature sensor 22 detects the air temperature blown immediately from the suction side evaporator 18, so as determine the refrigerant evaporation temperature Te. More specifically, a control current In supplied to the electromagnetic capacity control valve 11a is determined based on the deviation (Te−TEO) between the refrigerant evaporation temperature Te and the target evaporator temperature TEO (target cooling temperature), so that the refrigerant evaporation temperature Te is approached to the target evaporator temperature TEO.

The cooling fan 12a is controlled such that the air blowing amount is increased in accordance with an increase of the high-pressure side refrigerant pressure Ph. The blower fan 16a is controlled, such that the air blowing amount becomes approximately in maximum at an extremely low temperature area (maximum cooling area) and an extremely high temperature area (maximum heating area) of the target air temperature TAO, the air blowing amount becomes approximately in minimum at a middle temperature area, and the air blowing amount is reduced in accordance with a variation of the target air temperature TAO from the extremely low temperature area or the extremely high temperature area to the middle temperature area.

Figure 2:
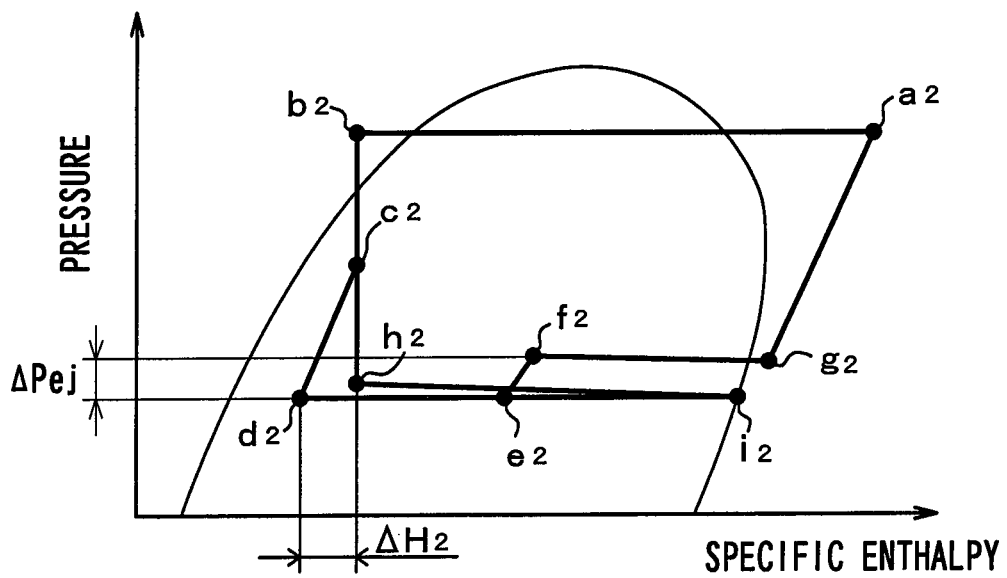
FIG. 2 is a Mollier diagram showing a refrigerant state of the ejector-type refrigerant cycle device of the first embodiment.

Thus, in the ejector-type refrigerant cycle device 10, high-temperature and high-pressure refrigerant (point $a_2$ in FIG. 2) discharged from the compressor 11 flows into the radiator 12, and is heat-exchanged with the blown air (outside air) blown by the cooling fan 12a to be radiated and condensed at the radiator 12 (point $a_2 \rightarrow$ point $b_2$ in FIG. 2).

The high-pressure refrigerant flowing out of the radiator 12 flows into the expansion valve 13 and is reduced in pressure and expanded to a middle-pressure refrigerant in iso-enthalpy (point $b_2 \rightarrow$ point $c_2$ in FIG. 2). At this time, the valve open degree of the thermal expansion valve 13 is adjusted so that a super heat degree of the refrigerant at the refrigerant outlet side of the discharge side evaporator 16 becomes a predetermined value (point $g_2$ in FIG. 2). In the present embodiment, the refrigerant outlet side of the discharge side evaporator 16 corresponds to the refrigerant suction side of the compressor 11.

The middle-pressure refrigerant decompressed and expanded by the expansion valve 13 flows into the branch portion 14, and is branched by the branch portion 14 into a flow of the refrigerant flowing into the nozzle portion 15a and a flow of the refrigerant flowing into the throttle 17. In the present embodiment, the refrigerant passage area and the refrigerant passage shape of the branch portion 14 are set, so as to set a ratio of a flow amount of the refrigerant flowing toward the nozzle portion 15a and a flow amount of the refrigerant flowing toward the throttle 17, and a refrigerant state flowing toward the nozzle portion 15a and a refrigerant state flowing toward the throttle 17. That is, the refrigerant passage area and the refrigerant passage shape of the branch portion 14 are set so as to improve the coefficient of performance in the entire cycle.

Middle-pressure refrigerant flowing into the nozzle portion 15a of the ejector 14 from the branch portion 14 is further decompressed and expanded by the nozzle portion 15a in iso-entropy (point $c_2 \rightarrow$ point $d_2$ in FIG. 2), and is jetted from the refrigerant jet port of the nozzle portion 15a. Thus, the refrigerant evaporated in the suction side evaporator 18 is drawn into the ejector 15 from the refrigerant suction port 15a.

Furthermore, the jet refrigerant jetted from the nozzle portion 15a and the suction refrigerant drawn from the refrigerant suction port 15c flow into the diffuser portion 15d of the ejector 15 to be mixed in the diffuser portion 15d (point $d_2 \rightarrow$ point $e_2$, point $i_2 \rightarrow$ point $e_2$ in FIG. 2). That is, the refrigerant passage sectional area is enlarged in the diffuser portion 15d as toward downstream so that the speed energy of the refrigerant is converted to the pressure energy thereof, thereby increasing the pressure of the refrigerant. The jet refrigerant and the suction refrigerant are mixed in the diffuser portion, thereby increasing the pressure of the mixed refrigerant (point $e_2 \rightarrow$ point $f_2$ in FIG. 2).

The refrigerant flowing out of the diffuser portion 15d flows into the discharge side evaporator 16, and is evaporated by absorbing heat from air blown by the blower fan 16a (point $f_2 \rightarrow$ point $g_2$ in FIG. 2). The gas refrigerant flowing out of the discharge side evaporator 16 is drawn into the compressor 11, and is compressed again (point $g_2 \rightarrow$ point $a_2$ in FIG. 2).

On the other hand, middle-pressure refrigerant flowing from the branch portion 14 toward the throttle 17 is decompressed and expanded in iso-enthalpy at the throttle 17, thereby reducing the refrigerant pressure (point $c_2 \rightarrow$ point $h_2$ in FIG. 2). The refrigerant flowing into the suction side evaporator 18 is evaporated by absorbing heat from air blown by blower fan 16a (point $h_2 \rightarrow$ point $i_2$ in FIG. 2), thereby cooling air to be blown into the vehicle compartment. The refrigerant flowing out of the suction side evaporator 18 is drawn into the ejector 15 from the refrigerant suction port 15c (point $i_2 \rightarrow$ point $e_2$ in FIG. 2).

The air blown by the blower fan 16a flows as in the arrow in FIG. 1. That is, the air blown by the blower fan 16a passes through the discharge side evaporator 16 and the suction side evaporator 18 in this order, and then flows into the same space to be cooled (e.g., vehicle compartment). At this time, the refrigerant evaporation pressure of the discharge side evaporator 16 becomes in a pressure pressurized by the diffuser portion 15d. On the other hand, the refrigerant evaporation pressure of the suction side evaporator 18 is a pressure immediately after being decompressed by the nozzle portion 15.

Thus, the refrigerant evaporation pressure (refrigerant evaporation temperature) of the suction side evaporator 18 can be made lower than the refrigerant evaporation pressure (the refrigerant evaporation temperature) of the discharge side evaporator 16. Therefore, a temperature difference between the blown air and the refrigerant evaporation temperature can be secured in both the discharge side evaporator 16 and the suction side evaporator 18, thereby effectively cooling the blown air.

Figure 3:
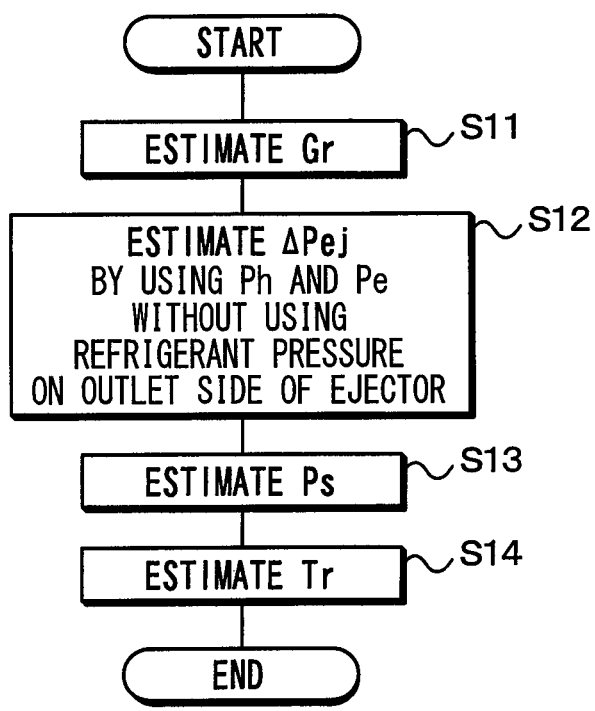
FIG. 3 is a flowchart showing a control process for estimating a drive torque of the compressor, according to the first embodiment.

A control process of the air conditioning controller 20 for controlling operation of the ejector-type refrigerant cycle device 10 will be described with reference to FIG. 3. FIG. 3 shows a control process for estimating a drive torque Tr of the compressor 11 in the ejector-type refrigerant cycle device.

The respective steps shown in FIG. 3 are configured by software and hardware in the air conditioning controller 20, so as to configure a compressor torque estimating device together with the high pressure sensor 21, the evaporator temperature sensor 22 and the compressor rotation speed sensor 23. The respective steps in FIG. 3 correspond to respective function portions provided in the compressor torque estimating device.

As shown in FIG. 3, at step S11, a refrigerant circulation flow amount Gr is estimated. Thus, step S11 is adapted as a refrigerant circulation flow amount estimating means.

Specifically, step S11, a discharge capacity of the compressor 11 is calculated based on a control current In supplied to the electromagnetic capacity control valve 11a. A refrigerant evaporation pressure Pe can be calculated based on the refrigerant evaporation temperature Te. Thus, at step S11, the refrigerant circulation flow amount Gr can be estimated based on the calculated discharge capacity, the rotation speed Ne of the compressor 11 detected by the compressor rotation speed sensor 23, and the calculated refrigerant evaporation pressure Pe and the high-pressure side refrigerant pressure Ph, by using a control map stored in the memory circuit. That is, step S11 estimates the circulation refrigerant flow amount Gr by using at least the detection value of the compressor rotation speed sensor 23.

Figure 4:
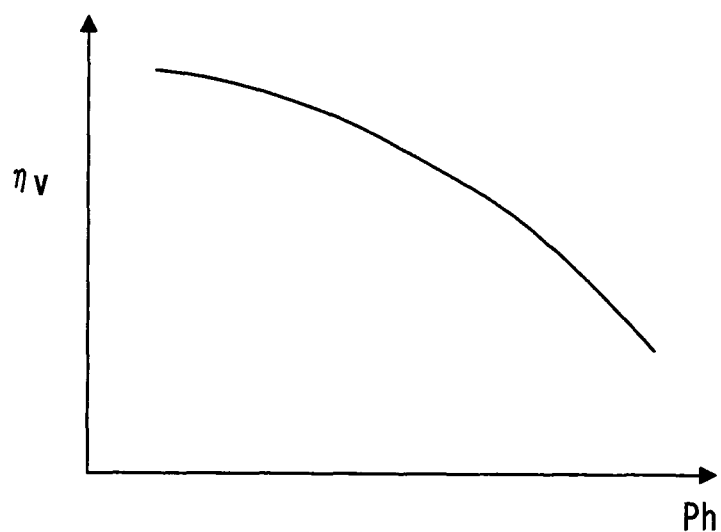
FIG. 4 is a graph showing the relationship between a high-pressure side refrigerant pressure Ph and a volume efficiency $\eta v$ in a compressor, according to the first embodiment.

As shown in FIG. 4, the volume efficiency ηv of the compressor 11 is decreased in accordance with an increase of the high-pressure side refrigerant pressure Ph. Thus, actually, the refrigerant circulation flow amount Gr changes in accordance with the refrigerant evaporation pressure Pe and the high-pressure side refrigerant pressure Ph, even when the control current In and the compressor rotation speed Nc are set at the same conditions.

Figure 5:
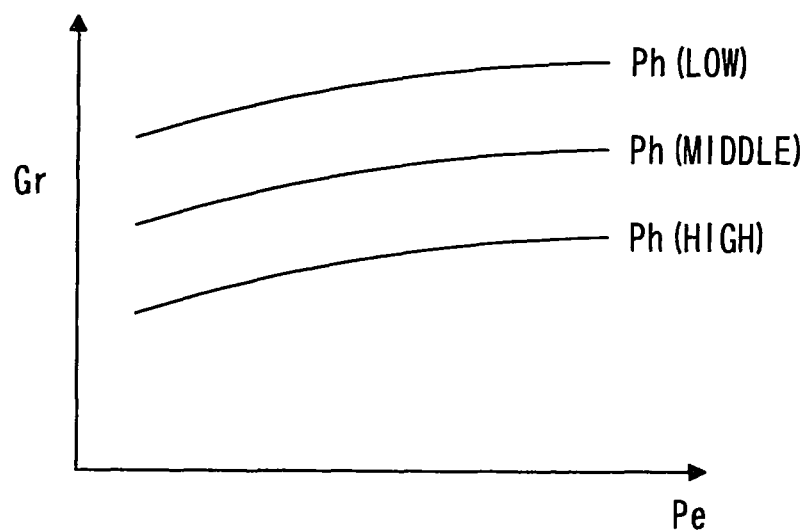
FIG. 5 is a graph showing the relationship between a refrigerant evaporation pressure Pe, a high-pressure side refrigerant pressure Ph and a refrigerant circulation amount Gr, according to the first embodiment.

In the present embodiment, the refrigerant circulation flow amount Gr can be more accurately estimated by using the control maps shown in FIGS. 4 and 5. In FIG. 5, Ph(LOW) indicates the relationship between the refrigerant circulation flow amount Gr and the refrigerant evaporation pressure Pe when the high-pressure side refrigerant pressure Ph is relatively low, Ph(MIDDLE) indicates the relationship between the refrigerant circulation flow amount Gr and the refrigerant evaporation pressure Pe when the high-pressure side refrigerant pressure Ph is relatively in a middle area, and Ph(HIGH) indicates the relationship between the refrigerant circulation flow amount Gr and the refrigerant evaporation pressure Pe when the high-pressure side refrigerant pressure Ph is relatively high.

Next, at step S12, a pressurizing amount $\Delta Pej$ in the diffuser portion 15d of the ejector 15 is estimated. Thus, step S12 is adopted as a pressurizing estimating means for estimating the pressurizing amount $\Delta Pej$ in the diffuser portion 15d of the ejector 15. More specifically, at step S12, a pressure difference $\Delta P$ (Ph−Pe) between the high-pressure side refrigerant pressure Ph and the refrigerant evaporation pressure Pe is calculated, and the pressurizing amount $\Delta Pej$ is estimated to be increased in accordance with an increase of the pressure difference $\Delta P$ (Ph−Pe) and an increase of the refrigerant circulation flow amount Gr estimated at step S11.

In the nozzle portion 15a of the ejector 15, the pressure energy of the refrigerant is converted to the speed energy. Therefore, the flow speed of the refrigerant jetted from the nozzle portion 15a is increased in accordance with an increase of a pressure difference between the inlet side pressure and the outlet side pressure of the nozzle portion 15a, that is, in accordance with an increase of pressure difference between the middle pressure of the refrigerant decompressed and expanded in the expansion valve 13 and the refrigerant evaporation pressure Pe.

The valve open degree of the expansion valve 13 is adjusted so that the super heat degree of the refrigerant at the refrigerant outlet side of the discharge side evaporator 16 becomes a predetermined value. Therefore, the valve open degree of the expansion valve 13 is reduced in accordance with an increase of the pressure difference $\Delta P$ (Ph−Pe). Thus, in accordance with an increase of the pressure difference $\Delta P$ (Ph−Pe), a pressure difference between the middle pressure of the refrigerant and the refrigerant evaporation pressure Pe is increased, thereby increasing the flow speed of the refrigerant jetted from the nozzle portion 15a. Furthermore, in accordance with the increase of the flow speed of the jet refrigerant, recovery energy per refrigerant flow amount of the jet refrigerant can be increased.

The recovery energy per refrigerant flow amount corresponds to an enthalpy difference ($\Delta H$ of FIG. 2) between the enthalpy of the refrigerant (point $d_2$ of FIG. 2) at the outlet side of the nozzle portion 15a and the enthalpy of the refrigerant (point $c_2$ of FIG. 2) at the inlet side of the nozzle portion 15a. Then, the total amount of the recovery energy can be estimated by integrating the refrigerant circulation flow amount Gr to the recovery energy per refrigerant flow amount.

More specifically, at step S12, the pressurizing amount $\Delta Pej$ in the diffuser portion 15d is estimated to be increased in accordance with an increase of the total amount of the recovery energy, because the recovery energy is converted to the pressure energy in the diffuser portion 15d of the ejector 15. That is, the pressurizing amount $\Delta Pej$ in the diffuser portion 15d is estimated to be increased in accordance with an increase of the pressure difference $\Delta P$ (Ph−Pe) and an increase of the refrigerant circulation flow amount Gr, thereby accurately estimating the pressurizing amount $\Delta Pej$ in the diffuser portion 15. As such, $$\Delta Pej = \text{function}(\Delta H \times Gr).$$

Next, at step S13, a suction refrigerant pressure Ps of the compressor 11 is estimated. Step S13 of the present embodiment is adopted as a suction pressure estimating means. Specifically, at step S13, the suction refrigerant pressure Ps of the compressor 11 is estimated by adding the pressurizing amount $\Delta Pej$ in the diffuser portion 15 estimated at step S12, to the refrigerant evaporation pressure Pe in the suction side evaporator 18.

Next, at step S14, a drive torque Tr of the compressor 11 is estimated. Step S14 of the present embodiment is adopted as a torque estimating means. More specifically, at step S14, the drive torque Tr of the compressor 11 is estimated by using the refrigerant circulation flow amount Gr estimated at step S11 and a pressurizing amount in the compressor 11. The pressurizing amount in the compressor 11 is obtained by subtracting the suction refrigerant pressure Ps from the high-pressure side refrigerant pressure Ph. Thus, at step S14, the drive torque Tr of the compressor 11 can be estimated by using the refrigerant circulation flow amount Gr estimated at step S11 and the suction refrigerant pressure Ps estimated at step S13. Then, the sub-routine shown in FIG. 3 is ended.

As described above, in the present embodiment, the pressurizing amount $\Delta Pej$ in the diffuser portion 15d of the ejector 15 is estimated at step S12, and the suction refrigerant pressure Ps of the compressor 11 is estimated at step S13. Thus, it is possible to accurately estimate the drive torque Tr of the compressor 11 by using the pressurizing amount in the compressor 11 and the refrigerant circulation flow amount Gr, thereby outputting the accurately estimated drive torque Tr of the compressor 11 to the engine controller 40.

Therefore, the engine controller 40 can suitably determine the air-conditioning fuel injection amount based on the accurately estimated drive torque Tr of the compressor 11. As a result, the fuel consumption for driving the compressor 11 can be reduced effectively. Furthermore, it can prevent a shortage of the standard fuel injection amount due to a shortage of the air-conditioning fuel injection amount, thereby preventing an engine stall.

Furthermore, the discharge side evaporator 16 and the suction side evaporator 18 are integrated to form the evaporator unit 19, and the discharge side evaporator 16 is arranged at an upstream air side of the suction side evaporator 18 in the evaporator unit 19. Therefore, the temperature of air cooled by the evaporator unit 19 corresponds to the refrigerant evaporation temperature Te in the suction side evaporator 18.

The refrigerant evaporation temperature Te in the suction side evaporator 18 is detected, and the refrigerant discharge capacity of the compressor 11 is controlled so that the refrigerant evaporation temperature Te is approached to the target refrigerant evaporation temperature TEO. Thus, the temperature of air to be blown into the vehicle compartment can be easily adjusted to a desired temperature.

In the present embodiment, even when the refrigerant evaporation temperature (refrigerant evaporation pressure) in the discharge side evaporator 16 is not detected, the drive torque of the compressor 11 can be accurately estimated. Therefore, the cost of the torque estimating device of the compressor 11 can be reduced while the drive torque of the compressor 11 can be accurately estimated.

Second Embodiment

Figure 6:
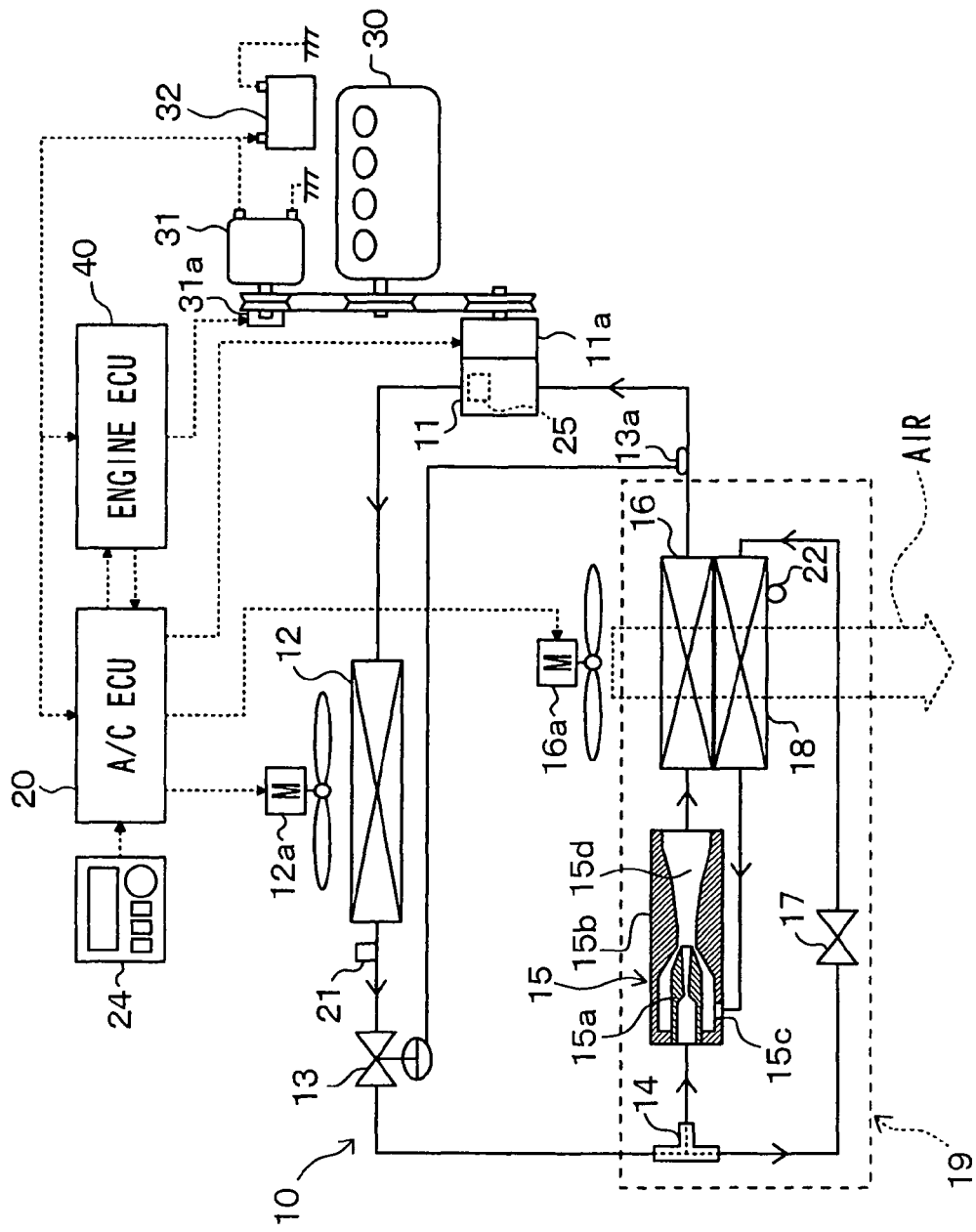
FIG. 6 is an entire schematic diagram of an ejector-type refrigerant cycle device according to a second embodiment of the invention.

A second embodiment of the present invention will be described with reference to FIG. 6. In the second embodiment, the compressor rotation speed sensor 23 shown in FIG. 1 is omitted, and a flow amount sensor 25 is disposed to directly detect a refrigerant flow amount discharged from the compressor 11, with respect to the above-described first embodiment. The flow amount sensor 25 can detect the refrigerant circulation flow amount Gr circulating in a refrigerant cycle.

Specifically, the flow amount sensor 25 is configured to include a throttle portion, a differential pressure detection portion, and a temperature/pressure detection portion, which are arranged in the housing of the compressor 11. In the flow amount sensor 25, the throttle portion is configured to pass the refrigerant to be circulated and to throttle the passed refrigerant, the differential pressure detection portion is configured to detect a pressure loss (pressure difference) in the throttle portion, and the temperature/pressure detection portion is configured to detect the temperature and the pressure of the refrigerant downstream of the throttle portion in the housing of the compressor 11. The flow amount sensor 25 detects the refrigerant circulation flow amount based on a refrigerant density that is estimated by using the detected value of the differential pressure detection portion and the detection value of the temperature/pressure detection portion.

In the air conditioning controller 20 of the second embodiment, because the refrigerant circulation flow amount Gr can be detected based on the detection value of the flow amount sensor 25, the control step S11 of FIG. 3 described in the above first embodiment can be omitted. In the second embodiment, the other parts of the ejector-type refrigerant cycle device 10 are similar to those of the above-described first embodiment.

In the second embodiment, because the refrigerant circulation flow amount Gr can be accurately directly detected by using the flow amount sensor 25, the drive torque Tr of the compressor 11 can be more accurately estimated.

The ejector 15 includes two refrigerant inlets, that is, the refrigerant inlet of the nozzle portion 15a and the refrigerant suction port 15c, and a single refrigerant outlet as the outlet of the diffuser portion 15d. Even in the ejector-type refrigerant cycle device 10 with the ejector 15, because the flow amount sensor 25 detects the flow amount of the refrigerant discharged from the compressor 11, the refrigerant circulation amount Gr before being branched can be accurately detected.

A flow amount sensor for detecting a flow amount of the refrigerant to be drawn into the compressor 11 may be provided instead of the flow amount sensor 25, and the refrigerant circulation amount Gr can be suitably detected. Even in this case, the same effects described above can be obtained.

Third Embodiment

Figure 7:
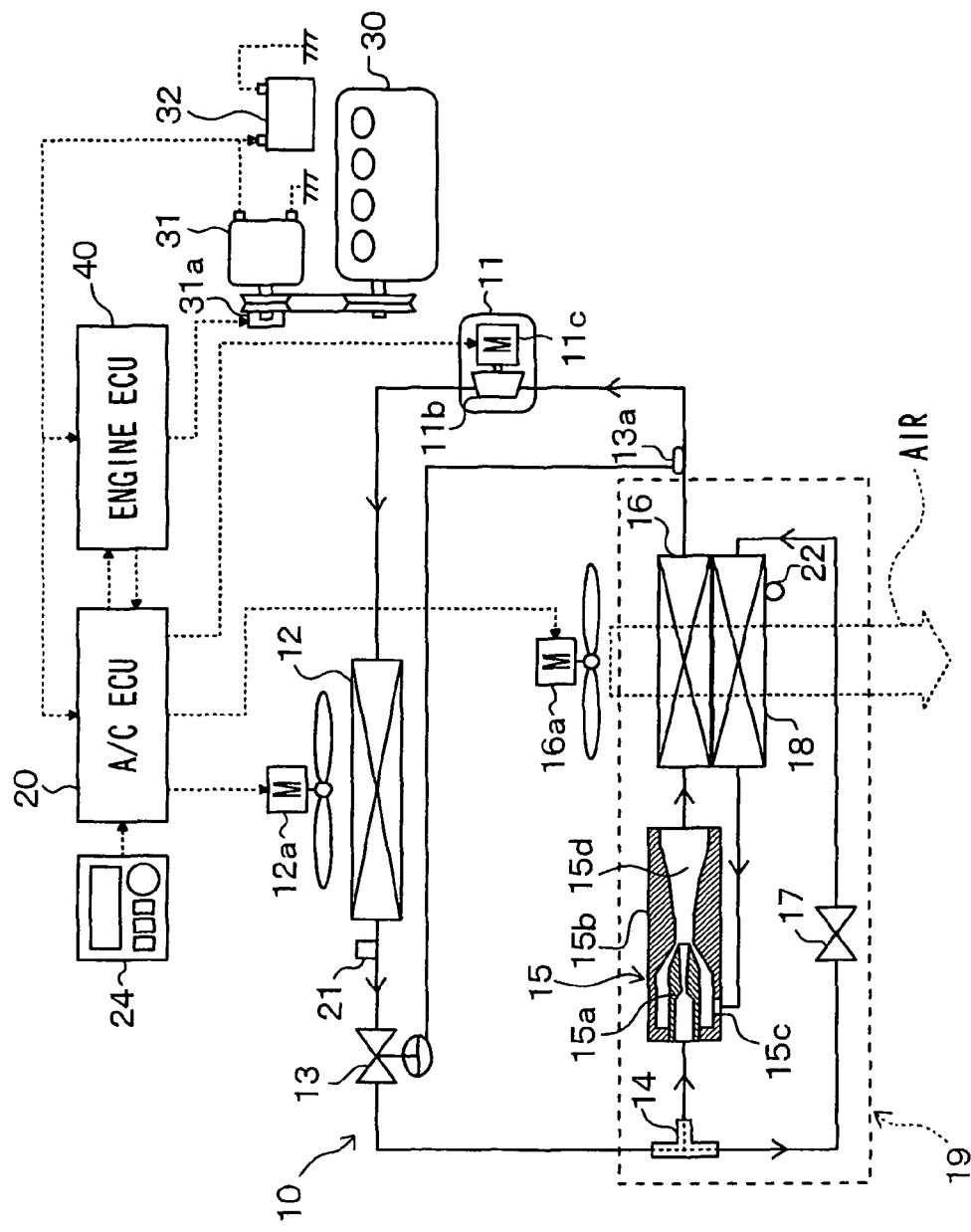
FIG. 7 is an entire schematic diagram of an ejector-type refrigerant cycle device according to a third embodiment of the invention.

A third embodiment of the present invention will be described with reference to FIG. 7. In the third embodiment, the structure of the compressor 11 is changed with respect to that of the first embodiment. In the third embodiment, as shown in FIG. 7, as the compressor 11, an electrical compressor is adapted, in which a fixed displacement compression mechanism 11b is driven by an electrical motor 11c to have a fixed discharge capacity.

As the fixed-displacement compression mechanism 11b, various compression mechanisms such as a scroll-type compression mechanism, a rolling piston-type compression mechanism, a plunger-type compression mechanism, a vane-type compression mechanism or the like may be used. The operation (e.g., rotational speed) of the electrical motor 11c is controlled by using control signals output from the air conditioning controller 20. As the electrical motor 11c, an AC motor or a DC motor may be used. A refrigerant discharge capacity of the compressor 11 is changed by the rotation speed control.

The operation (e.g., rotational speed) of the electrical motor 11c is controlled by using control signals output from the air conditioning controller 20. In the third embodiment, the compressor rotation speed sensor 23 described in the first embodiment and the flow amount sensor 25 described in the second embodiment are omitted. In the present embodiment, the rotation speed of the compressor 11 is determined by using a feedback control method such that the refrigerant evaporation temperature Te is approached to the target refrigerant evaporation temperature TEO, similarly to the above-described first embodiment.

Other configurations and control operation of the air conditioning controller 20 in the present embodiment are similar to those of the above-described first embodiment. Thus, even in the refrigerant cycle device 10 of the present embodiment, the same effects as in the first embodiment can be obtained. Furthermore, because the drive torque Tr of the compressor 11 can be accurately estimated, the consumption electrical power of the compressor 11 can be accurately estimated in real time.

In the engine controller 40 of the present embodiment, even in a case where the electrical amount stored in the battery 32 is larger than the standard storage amount, when the consumed electrical power of the compressor 11 becomes larger than the standard consumption power, the electromagnetic clutch of the electrical generator 31 is made in a connection state such that fuel is injected from the fuel injection valve by an injection amount that is an addition amount adding the electrical-generation fuel injection amount to the standard fuel injection amount. Here, the electrical-generation fuel injection amount is the fuel injection amount for driving the electrical generator 31. Thus, it can prevent the electrical storage amount of the battery 32 from being reduced, thereby preventing a shortage of the electrical power supplied to the components of the vehicle.

An electrical compressor is used as the compressor 11. Therefore, even when the ejector-type refrigerant cycle device is adapted to an electrical vehicle or a hybrid vehicle, the drive torque Tr of the compressor 11 can be accurately estimated.

Other Embodiments

The present invention can be changed variously as follows within a scope of the present invention, without being limited to the embodiment.

(1) In the above-described embodiments, the evaporator temperature sensor 22 is disposed to detect a fin temperature of the heat exchanging portion of the suction side evaporator 18, thereby detecting a physical amount relative to the refrigerant evaporation temperature (refrigerant evaporation pressure). However, a temperature detector other than the evaporator temperature sensor 22 may be used to detect the physical amount relative to the refrigerant evaporation temperature (refrigerant evaporation pressure).

For example, a temperature detector may be located at a position of the suction side evaporator 18, other than the fin of the heat exchanging portion. Alternatively, a temperature detector for directly directing the temperature and the pressure of the refrigerant flowing in the suction side evaporator 18 may be used. Furthermore, a temperature detector may be arranged to detect the temperature of air immediately after passing through the suction side evaporator 18.

In the above-described embodiments, the high pressure sensor 21 is disposed in the high-pressure refrigerant passage from the refrigerant discharge port of the compressor 11 to the refrigerant inlet of the expansion valve 13, so as to detect the pressure of the high-pressure side refrigerant. However, a pressure detector may be provided in a high pressure refrigerant passage from the refrigerant discharge port of the compressor 11 to the refrigerant inlet of the radiator 12, or within the radiator 12, so as to detect the pressure of the high-pressure side refrigerant before being decompressed.

In the above-described embodiments, the compressor rotation speed sensor 23 or the flow amount sensor 25 is used as a circulation flow amount detector. However, as the circulation flow amount detector, a detector for detecting a physical amount relative to the circulation refrigerant flow amount Gr or a detector for directly detecting the circulation refrigerant flow amount Gr may be used. As the flow amount sensor 25, a mass flow amount sensor such as a hot-wire flow amount sensor may be used.

(2) In the above-described embodiments, the ejector-type refrigerant cycle device 10 is provided with the branch portion 14 in which the refrigerant flowing out of the expansion valve 13 is branched such that one refrigerant stream branched at the branch portion 14 is decompressed in the nozzle portion 15a of the ejector 15 and the other refrigerant stream branched at the branch portion 14 is decompressed in the throttle 17. However, the present invention may be applied to other ejector-type refrigerant cycle devices without being limited to the above-described ejector-type refrigerant cycle device 10.

For example, an inner heat exchanger may be provided in the ejector-type refrigerant cycle device 10 to perform, heat exchange between a low-pressure refrigerant to be drawn into the compressor 11 and a high-pressure refrigerant flowing out of the radiator 12. Furthermore, the discharge side evaporator 16 may be omitted from the ejector-type refrigerant cycle device 10.

Alternatively/Furthermore, a gas-liquid separator may be provided to separate the refrigerant flowing out of the discharge side evaporator 16 into gas refrigerant and the liquid refrigerant. In this case, the gas refrigerant separated at the gas-liquid separator may be drawn into the compressor 11, and the liquid refrigerant separated at the gas-liquid separator may be drawn into the suction side evaporator 18. Alternatively, the discharge side evaporator 16 may be omitted, and a gas-liquid separator may be located downstream of the diffuser portion 15d of the ejector 15 so that the refrigerant flowing out of the diffuser portion 15 of the ejector 15 can directly flow into the gas-liquid separator.

In addition, a low-pressure side branch portion may be provided at a downstream side of the diffuser portion 15d of the ejector 15 to branch a flow of the refrigerant flowing out of the diffuser portion 15d of the ejector 15. In this case, the low-pressure side branch portion is provided, such that one refrigerant branched at the low-pressure side branch portion flows into the discharge side evaporator 16, and the other refrigerant branched at the low-pressure side branch portion flows toward the suction side evaporator 18. Furthermore, in the above-described ejector-type refrigerant cycle device, the expansion valve 13 may be omitted so that the high-pressure refrigerant is decompressed in first at the nozzle portion 15a or the throttle 17.

(3) In the above-described first embodiment, the torque estimating device for estimating the drive torque Tr of the compressor 11 is configured by using a part of the software and hardware of the air conditioning controller 20, the high pressure sensor 21, the evaporator temperature sensor 22 and the compressor rotation speed sensor 23. However, the torque estimating device for estimating the drive torque Tr of the compressor 11 may be configured by a part of the software and hardware of the air conditioning controller 20, the high pressure sensor 21 and the evaporator temperature sensor 22. Alternatively, the torque estimating device for estimating the drive torque Tr of the compressor 11 may be configured by a part of the software and hardware of the air conditioning controller 20.

Furthermore, the torque estimating device of the compressor 11 may be configured by a special high-pressure detector, a special evaporation pressure detector and a special circulation flow amount detector, which are not used for the air conditioning control.

(4) The above-described embodiment has been an example in which the ejector-type refrigerant cycle device 10 of the present invention is applied to a vehicular air conditioner, but the application of the present invention is not limited to this. For example, the ejector-type refrigerant cycle device 10 of the present invention may be adapted to an air conditioner for a fixed room, a refrigerator or the like.

(5) In the above-described embodiments, the discharge side evaporator 16 and the suction side evaporator 18 are integrally arranged to cool the same space to be air conditioned (e.g., vehicle compartment). However, the discharge side evaporator 16 and the suction side evaporator 18 may be arranged separately to cool respectively different spaces to be air conditioned. Because the refrigerant evaporation pressure (refrigerant evaporation temperature) of the discharge side evaporator 16 is higher than the refrigerant evaporation pressure (refrigerant evaporation temperature) of the suction side evaporator 18, the suction side evaporator 18 may be used to cool a freezing space of a refrigerator, and the discharge side evaporator 16 may be used to cool a refrigerating space of the refrigerator.

(6) In the above-described embodiment has been an example in which the usual fluorocarbon-based refrigerant is employed as the refrigerant, but the kind of the refrigerant is not limited to this. For example, hydrocarbon-based refrigerant, carbon dioxide, etc. may be used. Furthermore, the ejector-type refrigerant cycle device of the present invention may be configured to form a vapor-compression super-critical refrigerant cycle in which a refrigerant pressure on the high-pressure side exceeds the critical pressure of the refrigerant.

In the above-described ejector-type refrigerant cycle device 10, the radiator 12 is adapted as an exterior heat exchanger in which the refrigerant is heat exchanged with outside air, and the discharge side evaporator 16 and the suction side evaporator 18 are adapted as an interior heat exchanger (using-side heat exchanger) for cooling air to be blown into the vehicle compartment. However, the present invention may be applied to a heat pump cycle, in which the discharge side evaporator 16 and the suction side evaporator 18 are configured as the exterior heat exchanger to absorb heat from a heat source such as the atmosphere, and the radiator 12 may be configured as the interior heat exchanger for heating the refrigerant that is used to heat a fluid such as air or water to be heated.

Such changes and modifications are to be understood as being within the scope of the present invention as defined by the appended claims.

What is claimed is:

1. A torque estimating device of a compressor for an ejector-type refrigerant cycle that includes: the compressor configured to compress and discharge refrigerant; a radiator configured to cool the refrigerant discharged from the compressor; an ejector that includes a nozzle portion configured to decompress the refrigerant flowing out of the radiator, a refrigerant suction port from which refrigerant is drawn by jet refrigerant jetted from the nozzle portion, and a pressure increasing portion configured to mix the jet refrigerant and the refrigerant drawn from the refrigerant suction port and to pressurize the mixed refrigerant; and a suction side evaporator disposed in a branch passage through which the refrigerant flows from the radiator to the refrigerant suction port of the ejector to evaporate the refrigerant to be drawn into the refrigerant suction port, the torque estimating device comprising:
a pressure detector disposed on a discharge side of the compressor to detect a physical amount having a relation with a high-pressure side refrigerant pressure of the refrigerant cycle before the refrigerant is decompressed;
an evaporation pressure detector disposed to detect a physical amount having a relation with a refrigerant evaporation pressure in the suction side evaporator;
a circulation flow amount detector disposed in the compressor to detect a physical amount having a relation with a circulation refrigerant flow amount circulating in the refrigerant cycle;
a controller configured to:
estimate the circulation refrigerant flow amount by using the physical amount detected by the circulation flow amount detector;
estimate an enthalpy difference between an enthalpy of the refrigerant at an inlet side of the nozzle portion and an enthalpy of the refrigerant at an outlet side of the nozzle portion based on a pressure difference between the high-pressure side refrigerant pressure and the refrigerant evaporation pressure;
estimate a recovery energy by integrating the circulation refrigerant flow amount to the enthalpy difference;
estimate a pressurizing amount in the pressure increasing portion by converting the recovery energy to a pressure energy;
estimate a suction refrigerant pressure of the compressor by adding the pressurizing amount in the pressure increasing portion to the refrigerant evaporation pressure;
estimate a pressurizing amount in the compressor by subtracting the suction refrigerant pressure from the high-pressure side refrigerant pressure; and
estimate a drive torque of the compressor, by using the circulation refrigerant flow amount and the pressurizing amount in the compressor.

2. The torque estimating device of the compressor according to claim 1, wherein
the circulation flow amount detector is disposed to detect the circulation refrigerant flow amount circulating in the refrigerant cycle; and
a torque estimating unit estimates the drive torque of the compressor, using a suction refrigerant pressure estimated by a suction pressure estimating unit and using the circulation refrigerant flow amount detected by the circulation flow amount detector.

3. The torque estimating device of the compressor according to claim 2, wherein the circulation flow amount detector is a flow amount sensor disposed to detect a flow amount of the refrigerant discharged from the compressor or a flow amount of the refrigerant drawn into the compressor.

4. The torque estimating device of the compressor according to claim 1,
wherein the ejector-type refrigerant cycle device further includes a discharge side evaporator configured to evaporate the refrigerant flowing out of the pressure increasing portion of the ejector and to cause the evaporated refrigerant to flow toward a refrigerant suction side of the compressor,
wherein the discharge side evaporator and the suction side evaporator are disposed to cool a fluid to be cooled, and
the discharge side evaporator is disposed upstream of the suction side evaporator in a flow direction of the fluid to be cooled.

5. The torque estimating device of the compressor according to claim 1, further comprising a branch portion dividing fluid flow from the radiator into the branch passage and into an ejector passage in direct communication with the nozzle portion of the ejector.

6. The torque estimating device of the compressor according to claim 5, further comprising an expansion valve disposed between the radiator and the branch portion.

7. The torque estimating device of the compressor according to claim 6, further comprising a throttle disposed within the branch passage.

8. The torque estimating device of the compressor according to claim 1, further comprising a decompression device disposed within the branch passage.

9. The torque estimating device of the compressor according to claim 1, wherein the evaporation pressure detector detects the physical amount having the relation with the refrigerant evaporation pressure based on a refrigerant evaporation temperature.

10. The torque estimating device of the compressor according to claim 1, wherein the evaporation pressure detector does not receive input from a pressure sensor.

11. The torque estimating device of the compressor according to claim 1, wherein
estimate the circulation refrigerant flow amount based on a calculated discharge capacity of the compressor and a rotational speed of the compressor, the physical amount having a relation with the refrigerant evaporation pressure and the physical amount having a relation with the high-pressure side refrigerant pressure.

12. The torque estimating device of the compressor according to claim 11, wherein the pressurizing amount in the pressure increasing portion is increased in accordance with an increase of the pressure difference and an increase in the circulation flow amount.

13. The torque estimating device of the compressor according to claim 11, wherein the torque estimating device estimates the drive torque of the compressor using the circulation flow amount and a pressurizing amount of the compressor.

14. The torque estimating device of the compressor according to claim 13, wherein the pressurizing amount of the compressor is obtained by subtracting the suction refrigerant pressure from high-pressure side refrigerant pressure.

15. The torque estimating device of the compressor according to claim 1, wherein a suction pressure estimating unit estimates a suction refrigerant pressure of the compressor by adding the refrigerant evaporation pressure to the pressurizing amount estimated by the pressurizing estimating unit.

16. The torque estimating device of the compressor according to claim 1, wherein a pressurizing estimating unit estimates the pressurizing amount to be increased in accordance with the increase of the pressure difference and an increase of the circulation refrigerant flow amount.

17. A torque estimating device of a compressor for an ejector-type refrigerant cycle device that includes: the compressor configured to compress and discharge refrigerant; a radiator configured to cool the refrigerant discharged from the compressor; an ejector that includes a nozzle portion configured to decompress the refrigerant flowing out of the radiator, a refrigerant suction port from which refrigerant is drawn by jet refrigerant jetted from the nozzle portion, and a pressure increasing portion configured to mix the jet refrigerant and the refrigerant drawn from the refrigerant suction port and to pressurize the mixed refrigerant; and a suction side evaporator disposed in a branch passage through which the refrigerant flows from the radiator to the refrigerant suction port of the ejector to evaporate the refrigerant to be drawn into the refrigerant suction port, the torque estimating device comprising:

a pressure detector disposed on a discharge side of the compressor to detect a physical amount having a relation with a high-pressure side refrigerant pressure of a refrigerant cycle before the refrigerant is decompressed;

an evaporation pressure detector disposed to detect a physical amount having a relation with a refrigerant evaporation pressure in the suction side evaporator;

a circulation flow amount detector disposed in the compressor to detect a physical amount having a relation with a circulation refrigerant flow amount circulating in the refrigerant cycle;

a controller configured to:

estimate the circulation refrigerant flow amount by using the physical amount detected by the circulation flow amount detector;

estimate an enthalpy difference between an enthalpy of the refrigerant at an inlet side of the nozzle portion and an enthalpy of the refrigerant at an outlet side of the nozzle portion based on a pressure difference between the high-pressure side refrigerant pressure and the refrigerant evaporation pressure;

estimate a recovery energy by integrating the circulation refrigerant flow amount to the enthalpy difference;

estimate a pressurizing amount in the pressure increasing portion by converting the recovery energy to a pressure energy;

estimate a suction refrigerant pressure of the compressor by adding the pressurizing amount in the pressure increasing portion to the refrigerant evaporation pressure;

estimate a pressurizing amount in the compressor by subtracting the suction refrigerant pressure from the high-pressure side refrigerant pressure; and estimate a drive torque of the compressor, by using the circulation refrigerant flow amount and the pressurizing amount in the compressor; and a sensor group, the sensor group including an inside air temperature sensor configured to detect a temperature of a vehicle compartment, an outside air temperature sensor configured to detect an outside air temperature, a solar sensor configured to detect a solar radiation entering the vehicle compartment, the circulation flow amount detector being a compressor rotation-speed sensor for detecting a rotation speed of the compressor, wherein detected values of the high pressure sensor, the evaporation pressure detector and the compressor rotation-speed sensor are used to estimate the drive torque.

* * * * *